US009485607B2

(12) United States Patent
Aarnio

(10) Patent No.: US 9,485,607 B2
(45) Date of Patent: Nov. 1, 2016

(54) ENHANCING THE SECURITY OF SHORT-RANGE COMMUNICATION IN CONNECTION WITH AN ACCESS CONTROL DEVICE

(71) Applicant: Nokia Corporation, Espoo (FI)

(72) Inventor: Ari Aarnio, Espoo (FI)

(73) Assignee: Nokia Technologies Oy, Espoo (FI)

( * ) Notice: Subject to any disclaimer, the term of this patent is extended or adjusted under 35 U.S.C. 154(b) by 339 days.

(21) Appl. No.: 13/893,787

(22) Filed: May 14, 2013

(65) Prior Publication Data

US 2014/0342667 A1 Nov. 20, 2014

(51) Int. Cl.
*H04W 4/00* (2009.01)
*H04W 12/06* (2009.01)
*H04W 4/02* (2009.01)

(52) U.S. Cl.
CPC ............ *H04W 4/008* (2013.01); *H04W 4/023* (2013.01); *H04W 12/06* (2013.01)

(58) Field of Classification Search
CPC .... H04W 12/06; H04W 12/08; H04W 4/008
See application file for complete search history.

(56) References Cited

U.S. PATENT DOCUMENTS

| | | | |
|---|---|---|---|
| 5,260,551 A | 11/1993 | Wiik et al. | |
| 5,451,934 A | 9/1995 | Dawson et al. | |
| 6,026,166 A | 2/2000 | LeBourgeois | |
| 6,175,922 B1 | 1/2001 | Wang | |
| 6,421,453 B1 | 7/2002 | Kanevsky et al. | |
| 6,624,742 B1 | 9/2003 | Romano et al. | |
| 7,142,842 B2 | 11/2006 | Rooke et al. | |
| 7,176,886 B2 | 2/2007 | Marvit et al. | |
| 7,290,145 B2 | 10/2007 | Falkenthros | |

(Continued)

FOREIGN PATENT DOCUMENTS

| | | |
|---|---|---|
| EP | 0416792 | 3/1991 |
| EP | 0810559 | 12/1997 |

(Continued)

OTHER PUBLICATIONS

Ann Cavoukian, Ph.D., Mobile Near Field Communications (NFC) Tap 'n Go Keep it Secure & Private, Nov. 2011, Information and Privacy Commissioner, Ontario, Canada.

(Continued)

*Primary Examiner* — Bobbak Safaipour
*Assistant Examiner* — Devan Sandiford
(74) *Attorney, Agent, or Firm* — Lempia Summerfield Katz LLC

(57) ABSTRACT

An apparatus for enhancing the security of short-range communication in connection with an access control device may be provided. The system includes a mobile device and an application executing thereon. The application is configured to store a user-defined authentication for permitting short-range communication with the associated access control device and configured to control access to a secure location. The authentication is related to an action of an end user of the mobile device. The application is configured to determine when the devices are in proximity to one another, detect a movement of a user of the mobile device, and permit short-range communication between the devices when the devices are in proximity to one another and the detected movement is substantially similar to the defined authentication. The permitted short-range communication is related to information for permitting the user to access the secure location.

20 Claims, 6 Drawing Sheets

(56) References Cited

U.S. PATENT DOCUMENTS

| | | |
|---|---|---|
| 7,412,422 B2 | 8/2008 | Shiloh |
| 7,467,211 B1 | 12/2008 | Herman et al. |
| 7,536,721 B2 | 5/2009 | Stevens et al. |
| 7,685,034 B1 | 3/2010 | Mori et al. |
| 7,873,989 B2 | 1/2011 | Karkas et al. |
| 8,045,961 B2 | 10/2011 | Ayed et al. |
| 8,112,066 B2 | 2/2012 | Ben Ayed |
| 8,112,405 B2 | 2/2012 | Shiloh |
| 8,145,352 B2 | 3/2012 | Woodard et al. |
| 8,190,129 B2 | 5/2012 | Ben Ayed |
| 8,230,088 B2 | 7/2012 | Herman et al. |
| 8,260,262 B2 | 9/2012 | Ben Ayed |
| 8,336,766 B1 | 12/2012 | Miller et al. |
| 8,376,227 B2 | 2/2013 | Hammad et al. |
| 8,380,177 B2 | 2/2013 | Laracey |
| 8,467,770 B1 | 6/2013 | Ben Ayed |
| 8,479,978 B1 | 7/2013 | Miller et al. |
| 8,494,576 B1* | 7/2013 | Bye et al. ............. 455/550.1 |
| 8,496,168 B1 | 7/2013 | Miller et al. |
| 8,498,618 B2 | 7/2013 | Ben Ayed |
| 8,579,192 B1 | 11/2013 | Miller et al. |
| 8,645,348 B2 | 2/2014 | Shiloh |
| 2001/0037316 A1 | 11/2001 | Shiloh |
| 2003/0105715 A1 | 6/2003 | Friedman et al. |
| 2003/0153300 A1* | 8/2003 | Nakao ..................... 455/410 |
| 2005/0044390 A1* | 2/2005 | Trostle ..................... 713/188 |
| 2005/0096986 A1* | 5/2005 | Taylor et al. ............. 705/16 |
| 2006/0031932 A1* | 2/2006 | Vail et al. ................. 726/22 |
| 2007/0035411 A1 | 2/2007 | Jalkanen et al. |
| 2007/0040810 A1 | 2/2007 | Dowe et al. |
| 2008/0052522 A1* | 2/2008 | Mcardle ................... 713/182 |
| 2008/0170776 A1 | 7/2008 | Albertson et al. |
| 2008/0230598 A1 | 9/2008 | Bodin |
| 2008/0252415 A1 | 10/2008 | Larson et al. |
| 2008/0273764 A1 | 11/2008 | Scholl |
| 2009/0024636 A1 | 1/2009 | Shiloh |
| 2009/0070478 A1 | 3/2009 | Herman et al. |
| 2009/0183541 A1 | 7/2009 | Sadighi et al. |
| 2010/0197352 A1 | 8/2010 | Runstedler et al. |
| 2011/0061100 A1 | 3/2011 | Mattila et al. |
| 2011/0070828 A1 | 3/2011 | Griffin et al. |
| 2011/0070829 A1 | 3/2011 | Griffin et al. |
| 2011/0169729 A1 | 7/2011 | Holleis et al. |
| 2011/0187505 A1* | 8/2011 | Faith et al. ................. 340/10.1 |
| 2011/0215921 A1 | 9/2011 | Ben Ayed et al. |
| 2011/0251892 A1 | 10/2011 | Laracey |
| 2011/0282785 A1* | 11/2011 | Chin ......................... 705/42 |
| 2011/0293095 A1 | 12/2011 | Ben Ayed |
| 2011/0313922 A1 | 12/2011 | Ben Ayed |
| 2012/0019361 A1 | 1/2012 | Ben Ayed |
| 2012/0019379 A1 | 1/2012 | Ben Ayed |
| 2012/0060213 A1* | 3/2012 | Childress et al. ............. 726/18 |
| 2012/0075059 A1* | 3/2012 | Fyke et al. ................... 340/5.21 |
| 2012/0081282 A1* | 4/2012 | Chin ........................ 345/156 |
| 2012/0101911 A1 | 4/2012 | Shiloh |
| 2012/0192252 A1 | 7/2012 | Kuo et al. |
| 2012/0202423 A1 | 8/2012 | Tiedemann et al. |
| 2012/0227092 A1 | 9/2012 | Smith |
| 2012/0254032 A1* | 10/2012 | Carbonell Duque et al. .. 705/44 |
| 2012/0310618 A1 | 12/2012 | B'Far et al. |
| 2012/0310870 A1 | 12/2012 | Caves et al. |
| 2013/0086389 A1* | 4/2013 | Suwald ..................... 713/185 |
| 2013/0151111 A1 | 6/2013 | Skelton |
| 2013/0152185 A1* | 6/2013 | Singh et al. ................. 726/9 |
| 2013/0191789 A1 | 7/2013 | Calman et al. |
| 2013/0238455 A1 | 9/2013 | Laracey |
| 2013/0246203 A1 | 9/2013 | Laracey |
| 2013/0247117 A1 | 9/2013 | Yamada et al. |
| 2013/0260794 A1 | 10/2013 | Prchal et al. |
| 2013/0298208 A1 | 11/2013 | Ayed |
| 2013/0310163 A1 | 11/2013 | Smith et al. |
| 2014/0009268 A1 | 1/2014 | Oshima et al. |
| 2014/0045586 A1 | 2/2014 | Allen et al. |
| 2014/0049361 A1* | 2/2014 | Ahearn et al. ................. 340/5.7 |
| 2014/0050370 A1* | 2/2014 | Inkumsah et al. ............. 382/117 |
| 2014/0125453 A1* | 5/2014 | McIntyre et al. ............. 340/5.7 |
| 2014/0141864 A1 | 5/2014 | Ward et al. |
| 2014/0180850 A1* | 6/2014 | Ackley .......................... 705/16 |
| 2014/0181955 A1* | 6/2014 | Rosati .......................... 726/18 |
| 2014/0195925 A1* | 7/2014 | Wikander ..................... 715/748 |
| 2014/0298434 A1* | 10/2014 | Prchal ........................... 726/7 |

FOREIGN PATENT DOCUMENTS

| | | |
|---|---|---|
| EP | 0856624 | 8/1998 |
| EP | 2493232 | 8/2012 |
| EP | 2506201 | 10/2012 |
| GB | 2202354 | 9/1988 |
| GB | 2328843 | 3/1999 |
| GB | 2364202 | 1/2002 |
| WO | WO 93/14571 | 7/1993 |
| WO | WO9314571 | 7/1993 |
| WO | WO 94/01963 | 1/1994 |
| WO | WO9401963 | 1/1994 |
| WO | WO 02/31778 | 4/2002 |
| WO | WO0231778 | 4/2002 |
| WO | WO 2006094048 A2 * | 9/2006 |
| WO | WO2008092527 | 8/2008 |
| WO | WO 2011/057287 | 5/2011 |
| WO | WO2011057287 | 5/2011 |
| WO | WO2013027077 | 2/2013 |

OTHER PUBLICATIONS

Dennis Guse, Gesture-based User Authentication on Mobile Devices using Accelerometer and Gyroscope, May 31, 2011, Berlin Institte of Technology.

U.S. Appl. No. 13/853,470, filed Mar. 29, 2013, Ken Prchal.

International Search Report and Written Opinion cited in PCT/EP2014/056259, mailed Jun. 25, 2014.

Dennis Guse, "Gesture-Based User Authentication on Mobile Devices Using Accelerometer and Gyroscope", Berlin Institute of Technology, May 21, 2011.

Ann Cavoukian, PhD., "Mobile Near Field Communications (NFC) "Tap 'n Go" Keep it Secure & Private", Privacy by Design, Toronto, Canada, Nov. 2011.

* cited by examiner

US 9,485,607 B2

ENHANCING THE SECURITY OF SHORT-RANGE COMMUNICATION IN CONNECTION WITH AN ACCESS CONTROL DEVICE

BACKGROUND

The present embodiments relate to technologies and applications in short-range communication such as near-field communication (NFC) between devices in the immediate vicinity of each other. NFC technology may utilize magnetic field induction to enable contactless short-range communications between electronic devices. Some mobile devices incorporate NFC technology to facilitate two-way contactless and short-range communications between the respective mobile device and another electronic device. NFC technology is increasingly accepted as a way to conduct commerce, provide sensitive identifying information, share other personal data, and grant or deny access to a secure location.

Although short-range technologies provide users opportunities to easily perform a number of different actions with their electronic devices, there exists room for improvements. One area in which there is room for improvements is security. Although security measures are already available in, for example, NFC technology, there continues to be room for security-related improvements.

SUMMARY

To address these and other objectives, the present embodiments relate to enhancing the security of short-range communication in connection with an access control device.

A method for enhancing the security of short-range communication in connection with an access control device may be provided. A mobile device enabled as a first short-range communication device may be associated with the access control device, which may be enabled as a second short-range communication device. The access control device may be configured to control access to a secure location. A user authentication may be received via the mobile device. The user authentication may be for permitting short-range communication with the access control device and may be related to a movement of an end user of the mobile device. It may be determined whether the mobile device and the access control device are in proximity to one another. When it is determined that the access control device and the associated mobile device are in proximity to one another and a detected movement of a user of the mobile device is substantially similar to the provided user authentication, short-range communication between the mobile device and the access control device may be permitted. The short-range communication may be related to access information for permitting the user to access the secure location.

BRIEF DESCRIPTION OF THE DRAWINGS

Exemplary embodiments of the present invention are described herein with reference to the following drawings.

DETAILED DESCRIPTION OF THE PRESENTLY PREFERRED EMBODIMENTS

Figure 1:
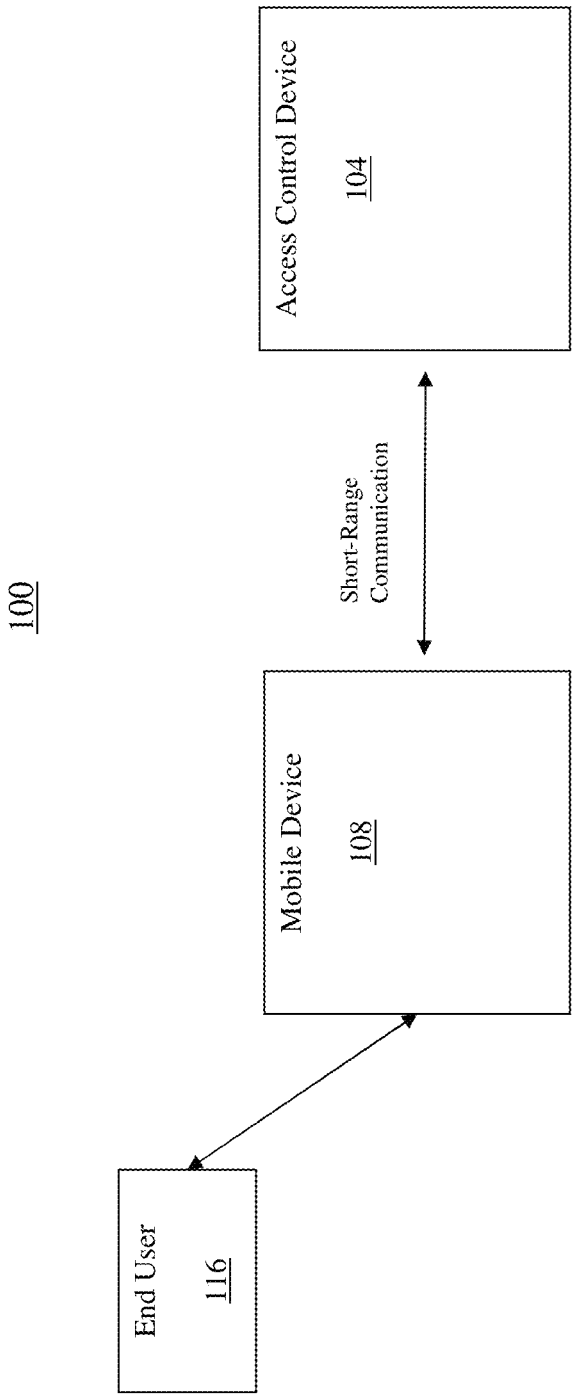
FIG. 1 depicts a block diagram of one embodiment of a system for enhancing security of short-range communication between a mobile device and an access control device.

The present embodiments aim to provide methods, computer readable storage media with instructions, and systems for enhancing the security of short-range communication in connection with an access control device configured to control access to a secure location. Short-range communication includes technologies such as, for example, Bluetooth, Bluetooth low energy, and near-field communication (NFC), One type of short-range communication may, for example, be used to trigger another type of short-range communication (e.g., NFC to trigger Bluetooth).

To enhance the security of short-range communication, the access control device may be associated (e.g., paired, with a mobile device and/or a user authentication may be provided by an end user of a mobile device. When the access control device and the mobile device are associated, the access control recognizes the mobile device the first and/or next time(s) the two devices are connected. When, however, the access control does not recognize the mobile device, communications between the two devices may be prevented, such that the association between the two devices serves to provide one level of security. The user authentication is related to one or more actions of the end user, such as one or more movements of the end user of the mobile device (e.g., one or more gestures of the end user, one or more movements performed on or using the mobile device, one or more movements on a display of the mobile device, one or more movements of the mobile device, or combinations thereof), specified by the end user. The user authentication is different than, and more than, a text-based password or personal identification number, and serves to provide another level of security. The provision of the user authentication may be based (e.g., contingent) on the devices touching or being in proximity to one another (e.g., an application for providing the user authentication may be opened when the devices are touching or in proximity to one another). One or more actions, such as one or more movements, performed by a user (e.g., the end user or a different user) of the mobile device may be determined. When the mobile device and the access control device are associated with each other and in proximity to one another and one or more of the actions performed by the user of the mobile device satisfy (e.g., are substantially similar to) the user authentication, short-range communication between the mobile device and the access control device may be permitted. The short-range communication is related to access information for permitting access to the security location.

Since the user authentication is at least partially specified by the end user, and short-range communication is only permitted when the specified user authentication is substantially satisfied and the mobile device and the access control device are associated with one another, the present embodiments may provide an extra layer of security to the short-range communications between the mobile device and the access control device. This may enhance the security of security or access information that may be exchanged using short-range communication (e.g., NFC), and, in turn, the security of secure locations or places access to which is controlled by the access control device. As such, end users may be encouraged to use, or increase usage of, short-range communication to control access to secure locations.

FIG. 1 shows a block diagram of one embodiment of a system 100 for enhancing the security of short-range communication in connection with controlling access to a secure location. The system 100 generally includes an access control device 104 and a mobile device 108. The access control device 104 and the mobile device 108 are each enabled as a short-range communications device. The mobile device 108 is associated with (e.g., owned or operated by) an end user 116. In other embodiments, the system 100 may be used for additional and/or different purposes and/or may include additional, different, or fewer components. For example, additional access control devices 104, mobile devices 108, and end users 116 may be provided.

The access control device 104 and the mobile device 108 communicate with one another via a short-range communications protocol. In the illustrated embodiment, the access control device 104 and the mobile device 108 communicate with one another via the near-field communication (NFC) communications protocol. In other embodiments, the access control device 104 and the mobile device 108 may communicate with one another via another short-range communications protocol, such as RFID, ISO standard 14443, Bluetooth, Bluetooth low energy, or other short-range communications protocol. NFC communications typically operate at 13.56 MHZ, but other suitable versions of NFC may operate at different operating frequencies. Although not specifically illustrated herein, the access control device 104 and/or the mobile device 108 may also be coupled to one or more wireless networks, wired networks, or combinations of a wired and wireless network, such as a cellular telephone network and/or 802.11x compliant network. The connected network may include a publicly accessible network, such as the Internet, a private network, or a combination thereof.

The access control device 104 is or may be part of an electronic locking device (e.g., an electronic lock or an electronic lockset). The access control device 104 is generally configured to control (e.g., limit, restrict) access to a secure place or location, such as, for example, a residence (e.g., home, apartment), an office, a room, a hotel room, other building, an event, a vehicle (e.g., a car, boat), a public transportation station or vehicle (e.g., a bus), other place or location, or combinations thereof. In other embodiments, the access control device 104 may control access to an object (e.g., a computer) or anything else to which controlled access may be desirable. The access control device 104 is associated with a secure point of entry, such as, for example, a door, a gate, or a turnstile, associated with (e.g., of) the secure location or place to which the control device 104 is controlling access. The access control device 104 may be positioned or located anywhere on, adjacent, or near the secure point of entry. The access control device 104 may or may not be movable between different locations.

Figure 2:
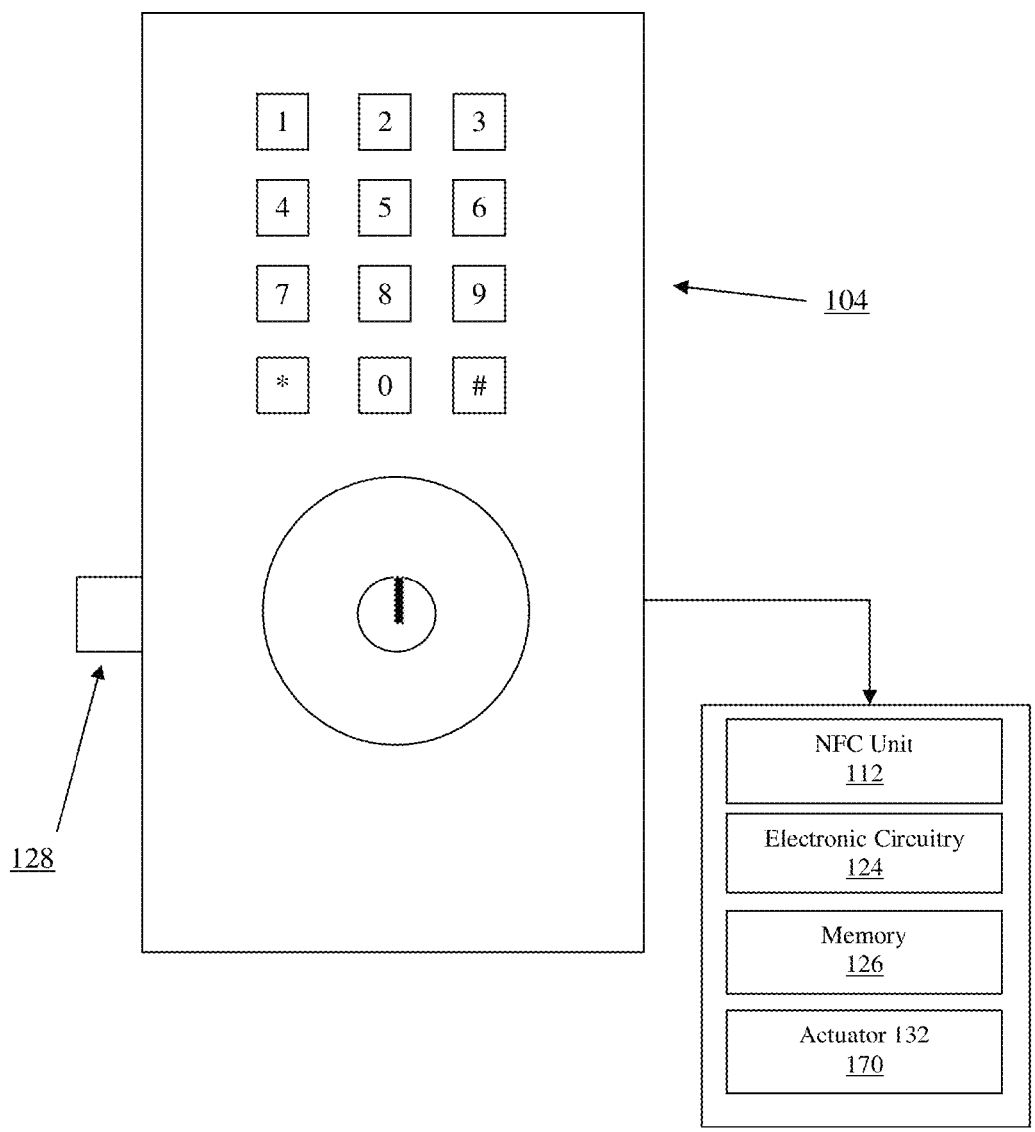
FIG. 2 depicts a more detailed view of an exemplary access control device of the system of FIG. 1.

Further details regarding the access control device 104 are now described in connection with FIG. 2. As shown in FIG. 2, the access control device 104 includes an NFC unit 112, electronic circuitry 124, a memory 126, a bolt mechanism 128, and an actuator 132. In other embodiments, the access control device 104 may include additional, fewer, or different components. For example, the access control device 104 may not include the NFC unit 112, such as, for example, when the access control device 104 and the mobile device 108 communicate with one another using other types of short-range communications.

Since the access control device 104 includes the NFC unit 112, the access control device 104 is NFC-enabled or operable. The NFC unit 112 facilitates NFC between the access control device 104 and the mobile device 108. The NFC unit 112 may be an NFC tag, NFC transponder, NFC reader, or other device that is NFC enabled and compatible.

The electronic circuitry 124 is in communication with the NFC unit 112. The electronic circuitry 124 may be provided through, for example, a wire or a battery. The electronic circuitry 124 may be or include one or more integrated circuits (e.g., application-specific integrated circuits), one or more logic components, one or more memory units, one or more processors, or combinations thereof. The electronic circuitry 124 operates pursuant to instructions in the memory 126. The memory 126 may be a volatile memory or a non-volatile memory. The memory 126 may include one or more of a read only memory (ROM), random access memory (RAM), a flash memory, an electronic erasable program read only memory (EEPROM), or other type of memory. The memory 126 may include an optical, magnetic (hard drive) or any other form of data storage device. The memory 126 may be removable from the access control device 104 (e.g., may be a secure digital (SD) memory card).

The bolt or bolt mechanism 128 is reconfigurable between an open or unlocked position and a closed or locked position. When the bolt 128 is in the unlocked position, the bolt 128 is positioned (e.g., recessed) within the access control device 104, such that the access control device 104 does not prevent access, or, in other words, permits access, to the secure place to which the device 104 is controlling access to. When the bolt 128 is in the locked position, the bolt 128 substantially extends from or outside of the access control device 104 and engages a bolt receiving portion (e.g., a door frame) of, at, or associated with the secure location, such that the access control device 104 limits or prevents access to the secure location to which the device 104 is controlling access to. The actuator 132 is in communication with the electronic circuitry 124 and the bolt mechanism 128. The actuator 132 is configured to control (e.g., adjust, change) the position of the bolt 128 based on instructions or commands received from the electronic circuitry 124. The actuator 132 may, for example, move the bolt 128 from the locked position to the unlocked position in response to a command from the electronic circuitry 124. In some embodiments, the actuator 132 may maintain the bolt 128 in the unlocked position, after access has been granted, for a pre-determined amount of time (e.g., 5, seconds, 10 seconds, or another value) before moving the bolt 128 back to the locked position. The pre-determined amount of time may vary based on the end user 116, based on the secure location (e.g., the time may be longer when the access control device 104 is controlling access to a residence), based on some other criteria (e.g., whether there are others in or at the secure location, whether the end user 116 is entering or exiting the secure location).

In other embodiments, the bolt or bolt mechanism 128 may vary from the bolt or bolt mechanism 128 depicted in FIG. 2. For example, the bolt 128 may have a different size and/or shape. In other embodiments, the position of the bolt 128 may be controlled (e.g., adjusted) in a different manner. For example, one or more components other than the electronic circuitry 124 and/or the actuator 132 may control the position of the bolt mechanism 128.

The access control device 104 is associated with an electronic access key, such as a code, personal identification number (PIN), or other electronic password. The electronic access key generally includes one or more alphanumeric characters (e.g., letters and/or numbers), but is not limited thereto. The access control device 104 may be programmed with the electronic access key by a manufacturer, distributor, or retailer of the access control device 104 or may be programmed by an end user of the access control device 104. In one embodiment, the manufacturer, distributor, or retailer of the access control device 104 may program the access control device 104 with a master electronic access key, which may be maintained by the manufacturer, distributor, or retailer in case problems should arise with the functionality of the access control device 104 (e.g., at which time the master electronic access key may be used to repair the device 104). In some cases, the end user of the access control device may program the access control device 104 with an electronic access key different from the electronic access key used to originally program the access control device 104. When the access control device 104 is programmed or re-programmed, the electronic access key may be stored in the memory 126. When the electronic access key is provided, such as by or via the mobile device 108, the access control device 104 may permit access to the secure location. When the electronic access key is not provided (e.g., no key is provided, the incorrect electronic access key is provided), the access control device 104 may prevent or restrict access to the secure location.

Figure 3:
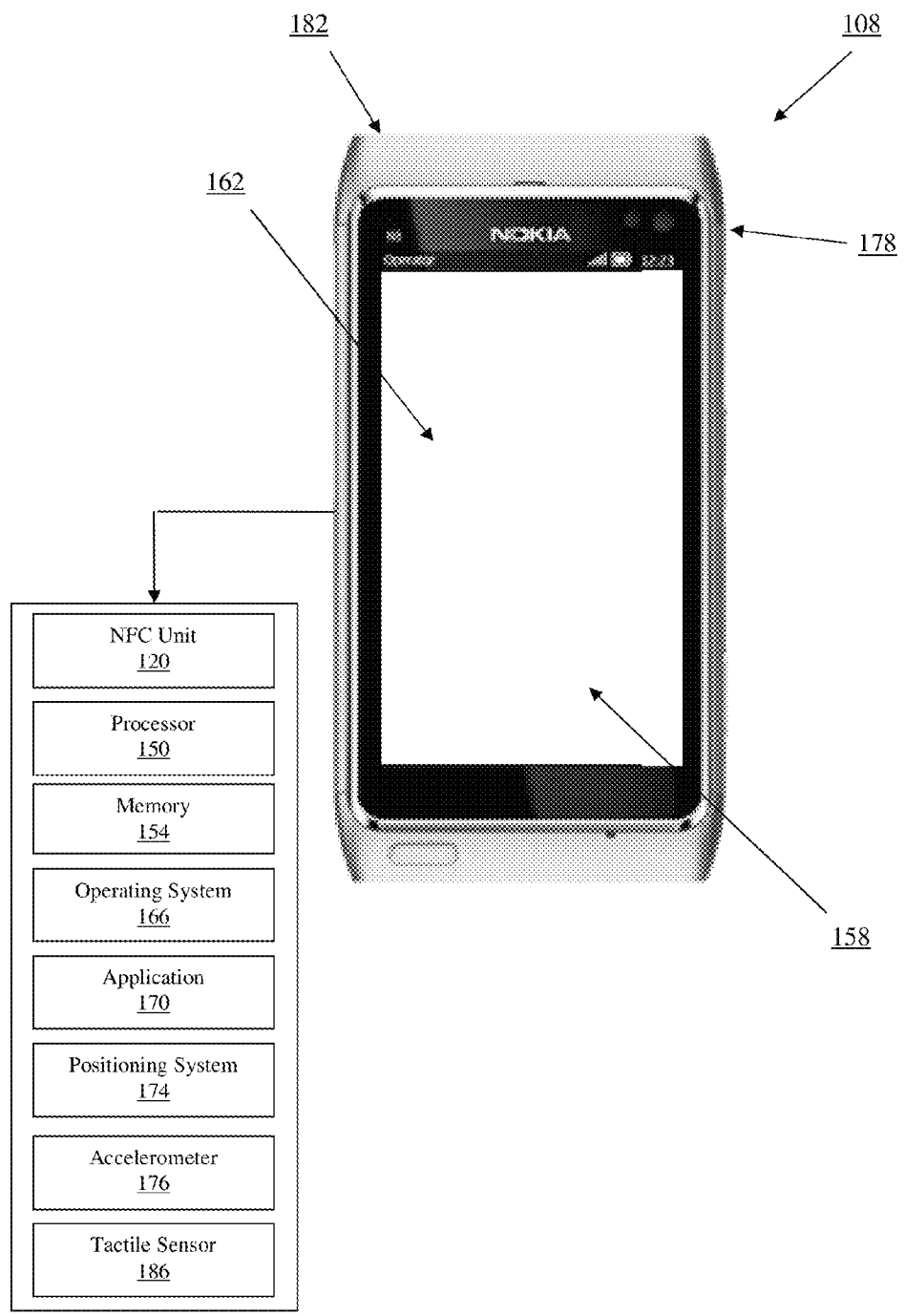
FIG. 3 depicts a more detailed view of an exemplary mobile device of the system of FIG. 1.

FIG. 3 shows one embodiment of the mobile device 108. In this embodiment, the mobile device 108 is a smart phone (e.g., manufactured by Nokia Corp.). In other embodiments, the mobile device 108 may be a mobile phone, a personal digital assistant ("PDA"), a tablet computer, a notebook computer, a personal navigation device ("PND"), a portable navigation device, a watch, a key fob, and/or any other known or later developed portable or mobile device, associated with the end user 116.

As shown in FIG. 3, the mobile device 108 includes an NFC unit 120, such that the mobile device 108 is NFC-enabled or operable and may be an NFC reader. The mobile device 108 also includes a processor 150, a memory 154, an input device 158, a display 162, an operating system 166, and an application 170. In other embodiments, the mobile device 108 may include additional, fewer, or different components. For example, the client device 108 may include additional input devices 158 and/or applications 170.

The processor 150 may be a general processor, a digital signal processor, ASIC, field programmable gate array, graphics processing unit, analog circuit, digital circuit, combinations thereof, or any other known or later developed processor. The processor 150 operates pursuant to instructions in the memory 154.

The memory 154 may be a volatile memory or a non-volatile memory. The memory 154 may include one or more of a read only memory (ROM), random access memory (RAM), a flash memory, an electronic erasable program read only memory (EEPROM), or other type of memory. The memory 154 may include an optical, magnetic (hard drive) or any other form of data storage device. The memory 154 may be removable from the mobile device 108 (e.g., may be a secure digital (SD) memory card).

The input device 158 may be or include one or more buttons, a keypad, a keyboard, a mouse, a stylist pen, a rocker switch, a touch pad, a touch screen, a voice recognition circuit, a microphone, a heat sensor, a capacitive sensor, an acoustic sensor, or other device or component for inputting data to the mobile device 108. The display 162 may be a liquid crystal display (LCD) panel, light emitting diode (LED) screen, thin film transistor screen, or another type of display. In the illustrated embodiment depicted by FIG. 3, the mobile device 108 has a touch screen, which may be capacitive, resistive, surface acoustic wave, or another type, such that the input device 158 and the display 162 are integrated.

As will be described in greater detail below, the end user 116 of the mobile device 108 may, via or using the input device 158 and/or the display 162, provide (e.g., define, specify, determine) a user authentication to be performed or satisfied to permit the mobile device 108 to exchange security data with the access control device 104, and perform an action with the mobile device 108 in an attempt to satisfy the previously provided user authentication and thus permit the aforementioned exchange of data and allow the end user 116 to access the secure location. Any or all of the above acts may be performed with or using the software application 170.

The operating system 166 is installed on or in the memory 154 of the mobile device 108 or a separate memory. The operating system 166 may be Linux, Microsoft Windows, Android, iOS, Windows CE, MAC OS X, or any other operating system.

The application 170 is installed and executable on the operating system 166 of the mobile device 108. The application 170 includes a user interface 172 that allows the end user 116 to provide (e.g., define, specify) a user verification or authentication (e.g., an authentication key) specific to the end user 116 for permitting the exchange of NFC data with the access control device 104 and, consequently, permitting access to the secure location. In other embodiments, the end user 116 does not provide the user verification. Instead, the application 170 provides the end user 116 with a user verification or authentication specific to the end user 116 (i.e., the end user 116 has no input) via the user interface 172 or in some other way (e.g., via email, SMS messaging).

The application or module 170 may be a mobile or smart phone application ("app"), a Web browser (e.g., Firefox, Internet Explorer), an email application, a messaging application, or other plug in or proprietary application built into or installed on the operating system 166. The application 170, or components thereof, may be automatically installed on or built into (e.g., come with) the operating system 166 of the mobile device 108 or may be downloaded or obtained (e.g., purchased) by the end user 116 and installed on the operating system 166 of the mobile device 108 after the mobile device 108 has been purchased or otherwise acquired. For example, the application 170 may be downloaded or obtained by the end user 116 and installed on the operating system 166 of the mobile device 108 when or at the same as the end user 116 obtains (e.g., purchases) the access control device 104. The application 170 may automatically execute on the mobile device 108 when the mobile device 108 is powering up, when the mobile device 108 is in proximity to the access control device 104, in response to a request from the access control device 104 (e.g., generated when the mobile device 108 is in proximity to the access control device 104), in response to a request from the end user 116, or in response to some other trigger or event.

The application 170 may be written in a suitable computer programming language such as C, although other programming languages (e.g., C++, Java, etc.) are also suitable. In one embodiment, the application 170 (or individual components thereof, as described below) may be implemented as computer program logic or computer readable program code stored in the memory and/or storage of a computer, such as the computer 300 described below with respect to FIG. 6, and executable by one or more processors thereof to implement the disclosed functionality.

The exemplary mobile device 108 shown in FIG. 3 also includes a positioning system 174. The positioning system 174 includes a global positioning system (GPS) or a cellular, WiFi-based, or similar position sensor for providing location data. The positioning system 174 may utilize GPS-type technology, a dead reckoning-type system, cellular location, or combinations of these or other systems. The positioning system 174 may include suitable sensing devices that measure the traveling distance, speed, direction, and so on, of the mobile device 108. The positioning system 174 may also include a receiver and correlation chip to obtain a GPS signal. The positioning system 174 outputs or transmits, to the processor 150, data indicative of the measured or determined position and/or speed of the mobile device 108.

The exemplary mobile device 108 shown in FIG. 3 further includes an accelerometer 176 and a camera 178. The accelerometer 176 is built or embedded into or within the interior of the mobile device 108. The camera 178 is located on or built into a top right-hand corner of the front surface or face 182 of the mobile device 108 (defined, at least in the depicted embodiment, as the surface or face of the device 108 facing the end user 116). In other embodiments, the camera 178 may be positioned or located elsewhere on the mobile device 108. For example, the camera 178 may be located on or built into a rear surface (not shown) of the mobile device 108. The camera 178 may, in some embodiments, include both a front and rear camera.

The accelerometer 176 and/or the camera 178 are configured to determine (e.g., detect, recognize, or measure) movement of the end user 116. The accelerometer 176 may determine rotational and/or translational movement of the mobile device 108 by the end user 116 or other source. For example, the accelerometer 176 may determine that the device 108 has been rotated at an angle of 30 degrees, 45 degrees, etc. about its vertical axis, horizontal axis, and/or other axis. The camera 178 may determine movement or a change in orientation or position of the end user 116 relative to the mobile device 108 (and, particularly, the camera 178). For example, the camera 178 may determine one or more gestures provided or performed by the end user 116. The camera 178 may determine (e.g., detect, recognize, or measure) side-to-side, up-to-down (or vice-versa), rotational, and/or other movement of the end user 116. This movement may be movement of one or more portions or one or more body parts of the end user 116, such as, for example, the end user's arm(s), finger(s), hand(s), shoulder(s), head, other portions and/or body parts, or combinations thereof, relative to the mobile device 108. The mobile device 108 may be moved at the same time (though to a lesser extent) or may be stationary. The accelerometer 176 and the camera 178 may, in turn, output or transmit, to the processor 150, data indicative of the determined movement, such as, for example, the direction, magnitude, absolute angle, other characteristic, or combinations thereof, of the determined movement of the end user 116.

The exemplary mobile device 108 shown in FIG. 3 further includes a touch or tactile sensor 186 built into or embedded into or within the interior of the mobile device 108. The touch or tactile sensor 186 may be any type of touch or tactile sensor, such as, for example, an infrared, acoustic, or capacitive sensor. The touch sensor 186 is configured to determine (e.g., detect, recognize, or measure) movement of the end user 116 relative to the mobile device 108. The touch sensor 186 is, however, configured to determine one or more movements of the end user 116 performed on or using the input device 158 and/or the display 162 of the mobile device 108. The one or more movements may be or include one or more touches (e.g., the end user 116 touches one letter), one or more swipes (e.g., the end user 116 swipes one or more lines or other shapes, etc.), or a combination thereof. For example, the touch sensor 186 may determine that the end user 116 swiped four different lines on the display 162 of the mobile device 108. The touch sensor 186 may, in turn, output or transmit, to the processor 150, data indicative of the determined movement, such as, for example, the direction, magnitude, other characteristic, or combinations thereof, of the measured movement of the end user 116.

In other embodiments, the exemplary mobile device 108 shown in FIG. 3 may include one or more other detectors or sensors located or positioned anywhere within, outside of, or a combination thereof, of the mobile device 108. The one or more other detectors or sensors may be or include one or more optical sensors or detectors, one or more motion sensors or detectors (e.g., an accelerometer, a tile sensor, and/or gyroscope), one or more touch or tactile sensors (e.g., infrared, acoustic, or capacitive sensor), any other known or later developed sensors or detectors, or combinations thereof.

With reference again to FIG. 1, when the mobile device 108 is in close proximity to or is touching the access control device 104, NFC between the access control device 104 and the mobile device 108 (through or using the NFC units 112 and 120, respectively) may be established. In some embodiments, close proximity encompasses a distance of between 0 and 20 cm. In one embodiment, close proximity refers to a distance of 2-3 cm. In other embodiments, close proximity may encompass a distance of greater or less than 2-3 cm or another value.

Once NFC has been established between the access control device 104 and the mobile device 108, data or information, such as access or security information (e.g., access codes, keys), are typically exchanged or communicated, using or via NFC, between the access control device 104 and the mobile device 108. As noted above, however, in the event that the mobile device 108 is lost or stolen, sensitive security information, and/or the exchanges of data pertaining thereto, may be replicated or compromised (by, for example, an un-authorized user). In turn, un-authorized access to secure locations (e.g., a residence, a vehicle) may be granted.

Accordingly, to enhance the security of these near-field communications and, thus, prevent un-authorized access to the secure location, the mobile device 108 may be associated with the access control device 104 before any data is exchanged between the access control device 104 and the mobile device 108, and the end user 116 may provide a user authentication that is to be provided (e.g., produced, input) to permit the exchange of data between the access control device 104 and the mobile device 108 when the devices are touching or in close proximity to one another. In some embodiments, the mobile device 108 may be associated with the access control device 104 before the user authentication is provided, but in other embodiments, the user authentication may be provided before the mobile device 108 is associated with the access control device 104.

The mobile device 108 may be associated (e.g., paired, linked, registered) with the access control device 104, such that the access control device 104 recognizes the mobile device 108 the first and/or next time(s) the two devices are connected (i.e., in proximity to or touching one another).

This may be accomplished in any number of ways. For example, the mobile device 108 may be associated with the access control device 104 by providing (e.g., inputting) an identifier associated with the access control device 104 (e.g., an identifier located on or in the packaging of the access control device 104) using or via the user interface 172. As another example, the mobile device 108 may be associated with the access control device 104 by providing (e.g., inputting) information to the access control device 104, such as a mobile device identifier (e.g., serial number), indicative of the mobile device 108. The mobile device 108 may be associated with the access control device 104 when the access control device 104 is obtained, when the mobile device 108 is obtained, or at some other time.

In other embodiments, the mobile device 108 may be associated with other access control devices 104. For example, the mobile device 108 may be associated with an access control device 104 that controls access to the residence of the end user 116 and a second access control device 104 that controls access to the vehicle of the end user 116. Alternatively or additionally, the access control device 104 may be associated with other and/or more than one mobile devices 108. For example, the access control device 104 may be associated with the mobile devices 108 of each respective member of a family, thus permitting the mobile devices 108 of the family to access the same secure location (e.g., the family home).

When the mobile device 108 is in close proximity to or touched against the access control device 104, the application 170 may indicate that it is ready to receive the user authentication from the end user 116. For example, the application 170 may provide text on the display 162 (e.g., "please provide the user authentication") or audio content via the input device 158 (e.g., an audio indication that the mobile device 108 is ready to receive the user authentication).

The end user 116 may, using or via the user interface 172 of the application 170, provide (e.g., define, create, specify) the user authentication or verification that is to be provided (e.g., produced, input) to permit the exchange of data between the access control device 104 and the mobile device 108 when the devices are touching or in close proximity to one another. The application 170 may, in some embodiments, be automatically initiated when the two devices are in proximity to one another. In turn, the end user 116 may be prompted to provide the user authentication via or using the user interface 172. The end user 116 may, for example, be prompted via text within the user interface 172 (i.e., the display 162 states, "please provide the user authentication," via audio (e.g., a speaker of the mobile device 108 provides the end user 116 with an indication that the user authentication is to be provided), or in some other way. The end user 116 may be allotted a pre-determined amount of time (e.g., 20 seconds) to provide the user authentication, after which the application 170 may be automatically shut down and access to the secure location may, as a result, be denied. In other embodiments, the end user 116 may manually initiate the application 170 when the mobile device 108 is in close proximity to or is touching the access control device 104, and may then provide the user authentication via or using the user interface 172 (with or without being prompted to do so). The process of providing the user authentication may, in some embodiments, be stopped (i.e., the end user 116 may no longer provide the user authentication) when the mobile device 108 and the access control device 104 are no longer touching or in close proximity to one another (e.g., the mobile device 108 is out of range of the access control device 104).

The user authentication is generally related to (e.g., includes, involves, identifies) one or more actions of a user of the mobile device 108. The one or more actions are to be produced (e.g., achieved, caused to happen) by the user of the mobile device 108 (e.g., the end user 116 or another user given permission by the end user 116). The user authentication is thus different than a typical text-based password (e.g., gobears), a personal identification number (e.g., 1234), and user characteristics (e.g., clothing, biometrics).

The one or more actions of the user may be or may include one or more movements to be produced by the user of the mobile device 108. The one or more gestures may be or include a movement or positioning (e.g., hovering) of a hand, arm, body, head, face, finger, other body part(s), or combinations thereof, of the user. The one or more gestures may be performed external (i.e., outside of) and/or relative to the mobile device 108. For example, the gesture may be a "thumbs up" from or by the user. The gestures may be a single sign or series of signs from a sign language (e.g., American Sign Language). The series of signs may spell out a password, or the series of signs may be sign language words of a pass phrase. The one or more movements may alternatively or additionally be performed on or via the mobile device 108, such as one or more gestures (e.g., swipes or touches) performed on or via the input device 158 and/or the display 162. For example, the gesture may be "swiping" four specific lines in a specific order on the display 162 of the mobile device 108. In other embodiments, the one or more movements may be or involve one or more movements of the mobile device 108 to be produced by the user. For example, the gesture may include "shaking" the mobile device 108. One or more other actions may be utilized as well. The one or more actions may, for example, be or include one or more commands, phrases, or words provided (e.g., issued) by the end user 116. For example, the user authentication may be a verbal password (e.g., Go Cubs!) spoken by the end user 116. Other actions may be used as well or instead, such as those actions described in co-pending U.S. patent application Ser. No. 13/853,470, entitled "Enhancing the Security of Near-Field Communication, and filed Mar. 29, 2013, the entire disclosure of which is hereby incorporated by reference in its entirety.

The one or more movements of the user may be detected by the input device 158 (e.g., a microphone or voice recognition circuit), in an image or video captured by the camera 178 of the mobile device 108, by the touch or tactile sensor 186 of the mobile device 108, via another component (e.g., one or more other sensors) of the mobile device 108, or combinations thereof.

In some embodiments, the end user 116 may specify two or more actions to be produced. For example, the end user 116 may specify a sequence of gestures that includes a "thumbs up" and side-to-side movement of the user's head. The two or more actions may need to be produced in a certain way (e.g., in an order) and/or within a pre-determined period of time (e.g., within 10 seconds), which may be specified by the end user 116 and/or the application 170.

The user authentication may be provided by the end user 116 by or via entering text, selecting options (e.g., provided as part of a check-list), specifying one or more touches or swipes, specifying one or more movements of the mobile device, providing audio content (e.g., speaking), providing (e.g., uploading) an image, series of images, and/or video content, or combinations thereof, in, via, or within the application 170. In some embodiments, the end user 116 may select or indicate the default or preferred way of providing the user authentication. For example, the end user 116 may indicate that he/she wishes to always provide audio content when providing the user authentication. The image, series of images, or video may be obtained (e.g., captured) by the end user 116 using the camera 178 of the mobile device 108 or via another camera (e.g., a camera of another mobile device) and may be stored in any number of different formats (e.g., JPEG, Bitmap, Tiff, SVG, AVI, MOV, MPG, etc.) When one or more images are provided, the one or more images may be pixelated and/or other image processing techniques may be applied to discern, for example, the one or more gestures desired by the end user 116. The audio content may be provided by the end user 116 using the input device 158 of the mobile device or in some other way (e.g., uploading an audio file). When audio content is provided, voice and/or speech recognition techniques may be applied to discern, for example, the content, the tone, and/or the source (e.g., the speaker) of the audio content.

The user authentication is specified by the end user 116, such that the user authentication is related to one or more personalized actions (e.g., movements) and/or a personalized sequence of actions. The user authentication is also specific to the mobile device 108. In other words, the user authentication is personalized to the mobile device 108 and the end user 116 associated therewith. In turn, an extra layer of security may be added, giving the end user 116 additional peace of mind regarding the communication(s) of potentially sensitive data.

Moreover, as a way of incorporating additional security, the user authentication may include a velocity or speed of one or more of the actions and/or one or more temporal requirements for one or more of the actions, as specified by the end user 116. The velocity may be the velocity in which the mobile device 108 is rotated and/or translated. The velocity may be the velocity in which one or more swipes and/or touches are performed on the mobile device 108. The one or more temporal requirements may be or include a specified time for completing one or more of the actions (e.g., 30 seconds), a specified time between one or more of the actions (e.g., after one of the movements is produced, no further movements are to be produced for 5 seconds), or a specified holding time before and/or after the one or more actions are produced. For example, the user may have 45 seconds to perform the specified gesture.

As noted above, the end user 116 may utilize the application 170 to provide the user authentication or verification. To this end, the application 170 may include features or components to help the end user 116 provide the user authentication. The application 170 may, in some embodiments, provide the end user 116 with authentication advice or guidance, such as tips or common or exemplary perspective strategies. For example, the application 170 may notify the end user 116 that the partially or completely provided user authentication is not sufficiently secure (i.e., not sufficiently complex), is sufficiently secure, or is sufficiently secure but may be overly complex (and, thus, difficult to re-produce). As another example, the application 170 may provide the end user 116 with one or more gestures that are commonly used to form the basis of a secure user authentication. Once the end user 116 provides the user authentication, the application 170 may prompt the user 116 to validate the user authentication by satisfactorily providing it once again. In the event that the user 116 is unable to validate the user authentication, the application 170 may prompt the user 116 to re-provide the user authentication or provide a different user authentication.

The user authentication may be specific to the access control device 104 (i.e., the end user 116 provides a different user authentication for different access control devices 104), one or more different access control devices 104, or may be universal to each of the different access control devices 104 (i.e., the same user authentication is provided for each access control device 104). The user authentication may, in some embodiments, be utilized only in specific circumstances, such as for a specific purpose and/or in a specific location. For example, the user authentication may only be utilized when the access control device 104 is being used for a specific purpose, such as to control access to a vehicle, residence, sports stadium, or a public transportation system. As another example, the user authentication may only be utilized when the access control device 104 is being used in a specific location(s), such as in specific neighborhoods or in connection with the user's vehicle or residence (e.g., on or adjacent a vehicle associated with the end user 116). The user authentication may also not be used in certain circumstances, such as, for example, in certain locations (e.g., not used for access to home but used for access to work). The user authentication may be changed at any time, such as at pre-determined frequencies (e.g., every day, once a week, once a month), such that the user authentication is dynamic and, thus, more secure.

After the end user 116 provides the user authentication via the application 170, the application 170 may generate or form an authentication code based on the provided user authentication. The authentication code is unique to and representative of the user authentication. The authentication code includes a plurality of alphanumeric characters (e.g., letters and/or numbers). For example, the authentication code may be a series of zeros and ones (e.g., 001001). The user authentication is different from the electronic access key associated with the access control device 104, though it need not be.

In turn, the user authentication and the authentication code may be stored in the memory 154 of the mobile device 108 and/or in another memory. The authentication code may be transmitted to the associated access control device 104 and stored therein (e.g., in the memory 126) as well. In some embodiments, the user authentication may be transmitted to the associated access control device 104 instead or as well.

Subsequent to the provision of the user authentication using the application 170, as described above, a user (e.g., the user 116 or another user) of the mobile device 108 may wish to exchange data between the access control device 104 and the mobile device 108 in order to obtain access to secure location, such as a residence, a vehicle, or a public transportation system. To this end, the user may move the mobile device 108 so that it is touching or in close proximity to the access control device 104 and near-field communications between the two devices are possible. However, because of the additional security measures offered by the present embodiments, the desired data exchange (e.g., of access information) between the access control device 104 and the mobile device 108 does not occur until or unless the devices are associated with one another (i.e., the access control device 104 recognizes the mobile device 108) and the previously provided user authentication is substantially provided or satisfied. In other words, data may only be exchanged between the access control device 104 and the mobile device 108 when the devices are in proximity to one another, the access control device 104 and the mobile device 108 are associated with one another, and one or more actions are produced or performed by the user of the mobile device 108 that substantially satisfy or match the provided user authentication.

First, the access control device 104 may determine whether the mobile device 108 has been associated (e.g., linked, registered) with the access control device 104. This may be done, for example, using the mobile device identifier of the mobile device 108. Once it is determined that the access control device 104 and the mobile device 108 are associated with one another and the devices are touching or in close proximity to one another, the access control device 104 may request that the user of the mobile device 108 perform or satisfy the pre-defined user authentication. The application 170, and, more particularly, the user interface 172, may be automatically initiated and prompt the user, via or using, for example, the display 162, to perform one or more un-specified actions, such as one or more un-specified movements (e.g., one or more movements external to the mobile device 108, one or more movements on or using the mobile device 108, one or more movements of the mobile device 108, etc.) in an attempt to satisfy the pre-defined user authentication and, in turn, permit the exchange of data. The user interface 172 may provide (e.g., allot) the user a pre-determined or specified amount of time (e.g., 1 minute) and/or opportunities (e.g., 5 chances) to perform the one or more actions. The application 172 may, alternatively, provide or allot the user an unlimited amount of time and/or opportunities to perform the one or more un-specified actions. In other embodiments, the user may initiate the user interface 172 when the access control device 104 and the mobile device 108 are touching or in close proximity to one another, or the user interface 172 may be initiated in response to some other trigger or event.

The application 170 is then configured to determine (e.g., detect, recognize, or measure) one or more actions performed by the user in response to or based on the prompt. The one or more actions may be or include one or more movements produced by the user, such as, for example, one or more gestures. The one or more gestures may be or include, for example, one or more movements of a hand, arm, body, head, face, finger, other body part(s), or combinations thereof, of the user. The one or more movements may, alternatively or additionally, include one or more gestures, such as swipes or touches, performed on or via the mobile device 108, one or more movements of the mobile device 108, one or more other movements, or combinations thereof. For example, the one or more movements may include capturing, using the camera 178, an external gesture produced by the user (i.e., the gesture is performed outside of the mobile device 108). As another example, the one or more movements may include swiping, on the display 162, a plurality of shapes (e.g., lines). The one or more actions may, alternatively or additionally, include one or more commands, words, or phrases provided (e.g., issued) by the user.

Since the one or more actions are generally performed or produced by manipulating one or more of the sensors or detectors of the mobile device 108, the application 170 determines the one or more actions using or based on the input device 158, the positioning system 174, the one or more sensors or detectors provided with or in the mobile device 108, such as, for example, the accelerometer 176, the camera 178, the tactile sensor 186, one or more other sensors or detectors, or combinations thereof. More specifically, the application 170 determines the one or more actions using or based on data indicative of the one or more actions output by the one or more sensors or detectors and transmitted to the processor 150. In the embodiments in which the mobile device 108 includes the input device 158, the accelerometer 176, the camera 178, and the tactile sensor 186, the application 170 may determine the one or more movements using or based on data input to or using the input device 158, data indicative of position and/or speed information determined and output by the positioning system 174, data indicative of rotational and/or translational movement of the mobile device 108 as determined and output by the accelerometer 176, data indicative of one or more images and/or video content obtained (e.g., captured) by the camera 178, data indicative of one or more touches or swipes on the mobile device 108 as determined and output by the tactile sensor 186, other data indicative of rotational and/or translational movement determined and output by one or more motion sensors or detectors, or combinations thereof. In some embodiments, the application 170 may determine the one or more actions using or based on data output by and obtained from the access control device 104. The data output by and obtained from the access control device 104 may, for example, indicate the translational and/or rotational movement of the mobile device 108 relative to the access control device 104. In other embodiments, the mobile device 108 may determine the one or more actions using or based on data indicative of information determined and output by other sensors or detectors.

When the application 170 determines that one or more actions have been performed by the user, the application 170 may generate data indicative of the one or more actions. The data indicative of the one or more actions may, for example, be a code generated based on the one or more movements. For example, the data indicative of the one or more actions may be a code generated based upon a "thumbs up" gesture produced by the user of the mobile device 108. The code, like the authentication code described above, may include a plurality of alphanumeric characters. The generated code may substantially match the previously generated authentication code when the one or more performed actions substantially match or equal the provided user authentication. The generated code may not, however, substantially match the previously generated authentication code when the one or more performed actions do not substantially match or equal the provided user authentication. In some embodiments, the generated code may be transmitted to the access control device 104 and stored in the memory 126 of the device 104.

In some embodiments, the access control device 104 may provide the mobile device 108 with sufficient power to enable the user authentication to be provided and/or the one or more actions to be performed by the user of the mobile device 108. For example, the access control device 104 may provide the mobile device 108 with power when the battery of the mobile device 108 has little or no remaining power, such that the user of the mobile device 108 is not prevented from accessing the secure location simply because his/her phone is low on power.

The system 100, via the application 170 and/or the access control device 104, may (i) determine whether the one or more actions performed by the user of the mobile device 108 substantially satisfy the provided and stored user authentication, and (ii) control access to the secure location based on this determination.

In some embodiments, the access control device 104 is configured to determine whether the one or more actions performed by the user of the mobile device 108 satisfy the provided and stored user authentication. The access control device 104 may receive, from the mobile device 108, the data indicative of the performance of one or more actions by the user. As noted above, the data indicative of the one or more actions may, for example, be a code (e.g., generated by the application 170 to enable transfer over the short-range communication link). The access control device 104 may, in turn, compare the data indicative of the one or more actions performed by the user with the data indicative of the user authentication (stored, for example, in the memory 126 of the access control device 104). In one embodiment, the access control device 104 may compare the code associated with the one or more performed actions with the previously generated authentication code associated with the provided user authentication. The comparison may be performed using a minimum requirement or threshold, such as, for example, a number (e.g., 1) of standard deviations from or within the provided and stored user authentication and/or a percentage of the one or more performed actions that match the provided and stored user authentication. For example, the access control device 104 may determine whether 90% of the generated code equals or matches the previously generated authentication code.

In other embodiments, the mobile device 108 is configured to determine whether the one or more actions performed by the user of the mobile device 108 satisfy the provided and stored user authentication. The mobile device 108 may compare the above-described generated code, which is associated with the one or more performed actions, with the previously generated authentication code associated with the provided user authentication. The mobile application 170 may then transmit data indicative of whether the one or more actions performed by the user of the mobile device 108 satisfy the provided and stored user authentication.

The access control device 104 is configured to control access to the secure location to which it is assigned based on the determination of whether the one or more actions performed by the user substantially satisfy the provided and stored user authentication. Satisfaction of the user authentication is indicative of the user being an authorized user (e.g., the end user 116 that provided the user authentication in the first place or another user granted permission to use the mobile device 108 by the end user 116) rather than an un-authorized user (e.g., a person that stole or found the mobile device 108). Accordingly, when the system 100 determines that the one or more actions performed by the user with the mobile device 108 satisfy the user authentication, the system 100 determines (e.g., assumes, verifies) that the user is an authorized user. In turn, the access control device 104 transmits, or permits the mobile device 108 to obtain from the access control device 104, access control data via the NFC unit 112. The access control data may be related to (e.g., include) the electronic access key configured to permit access to the secure location associated with the access control device 104.

When the mobile device 108 subsequently provides the access control data to the access control device 104, the electronic circuitry 124 may instruct the actuator 132 to change or adjust the position of the bolt 128. The actuator 132 may change or adjust the bolt 128 from the locked position shown in FIG. 2 to the unlocked position in which access is permitted. The user of the mobile device 108 may, as a result, access the secure location associated with the access control device 104.

When, however, the system 100 determines that the one or more actions performed by the user do not satisfy the user authentication (i.e., the one or more actions do not exactly or substantially equal or satisfy the user authentication), the system 100 may determine or conclude that the user is not an authorized user. For example, the system 100 may determine that the user is not an authorized user when the code associated with the one or more actions does not substantially match the previously generated code associated with the user authentication. The system 100 may thus refuse to permit the exchange or communication of data between the access control device 104 and the mobile device 108, thereby preventing the user of the mobile device 108 from accessing the secure location associated with the access control device 104.

In some situations, the system 100 may be correct that the user is indeed an un-authorized user. In other situations, though, the user might actually be an authorized user who did not properly perform the one or more actions (e.g., the mobile device 108 did not properly recognize the gesture). Accordingly, to prevent the system 100 from undesirably preventing an authorized user from exchanging data, and, thus, undesirably preventing access to the secure location associated with the access control device 104, the system 100 may provide the user with one or more additional opportunities to satisfy the user authentication. The system 100 may, in the same manner described above, determine whether the user satisfies the user authentication when given these one or more additional opportunities.

In other embodiments, one or more of the above-noted tasks (e.g., providing the user authentication, determining the one or more actions performed by the user with the mobile device 108, determining whether the one or more actions satisfy the user authentication) may be performed by or shared with different components of the system 100 (e.g., the access control device 104). For example, the access control device 104 may determine the one or more actions performed by the user with the mobile device 108 instead of or in conjunction with the application 170 of the mobile device 108. As another example, the access to or permission to exchange data may be controlled by the mobile device 108 rather than the access control device 104.

Figure 4:
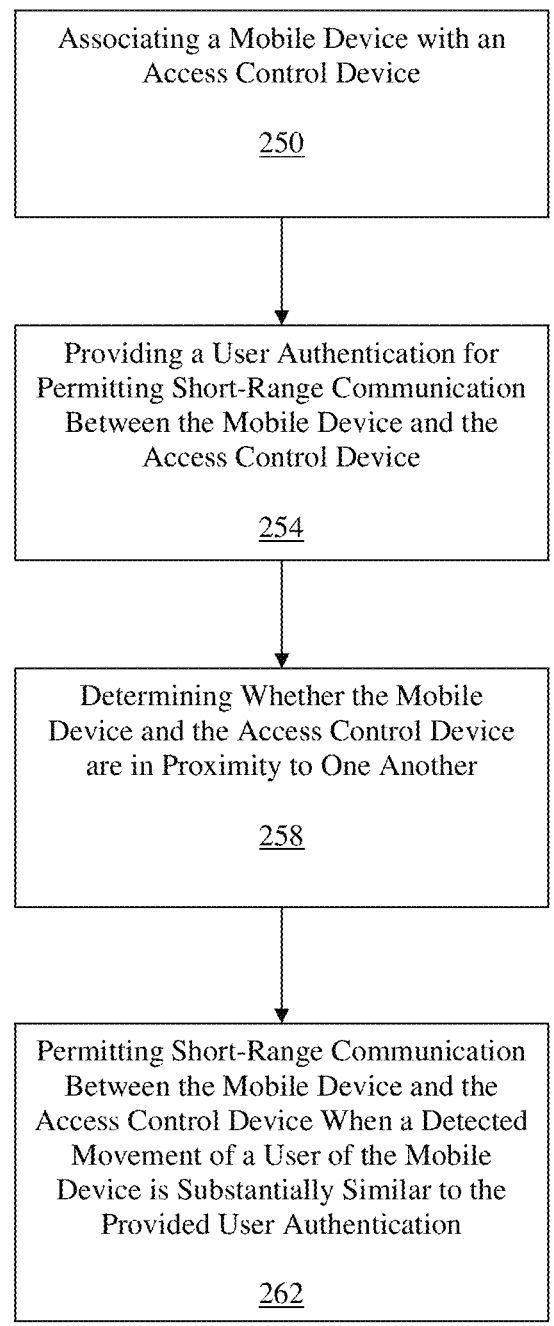
FIG. 4 depicts a flow chart showing one embodiment of a method for enhancing security of short-range communication between a mobile device and an access control device.

FIG. 4 shows a flow chart depicting a method or operation for enhancing security of a short-range communication (e.g., Bluetooth, Bluetooth low energy, near-field communication) between a mobile device (e.g., the mobile device 108) enabled as a first short-range communication device and an access control device (e.g., the access control device 104) enabled as a second short-range communication device. The method or operation may be implemented using the system 100 described above. In other embodiments, a different system may be used. The method is implemented in the order shown, but may be implemented in or according to any number of different orders. Additional, different, or fewer acts may be provided. For example, two or more user authentications may be provided (e.g., for different access control devices). As another example, the determining and permitting acts may be repeated any number of times.

The operation or method includes associating the mobile device with the access control device (act 250). The access control device is configured to control access to a secure location, such as, for example, a residence (e.g., home, apartment), an office, a room, a hotel room, other building, an event, a vehicle (e.g., a car, boat), a public transportation station or vehicle (e.g., a bus), other place or location, or combinations thereof. The mobile device may be associated with the access control device in connection with a payment of rent or a rate for the use of the secure location. For example, the mobile device may send payment for a hotel room or another reservation in order to be associated with the access control device.

The operation or method includes receiving a user authentication via the mobile device (act 254). The user authentication is for permitting short-range communication with the access control device. The user authentication is related to a movement of an end user (e.g., the end user 116) of the mobile device. The user authentication may, in some embodiments, include a movement, relative to the mobile device, of a body part of the end user of the mobile device. The user authentication may, in some embodiments, include a gesture of the end user of the mobile device. The user authentication may, in other embodiments, include a plurality of movements performed by the end user of the mobile device on or using a display (e.g., the display 162) and/or input device (e.g., the input device 158) of the mobile device.

The operation or method includes determining whether the mobile device and the access control device are in proximity to one another (act 258), and permitting short-range communication between the mobile device and the access control device when a detected movement of a user of the mobile device is substantially similar to the provided user authentication and the access control device and the associated mobile device are in proximity to one another (act 262). The short-range communication is related to access information for permitting the user to access the secure location. For example, the short-range communication may include access information such as an electronic access key. Access to the security location may be permitted based on the permitted NFC.

The operation or method may further include providing a second user authentication, different from the user authentication, specified by the end user of the mobile device for permitting short-range communication between the mobile device and a second access control device that is different than the access control device and is associated with a second secure location different from the secure location. Any number of different or additional user authentications may be provided for permitting short-range communication between the mobile device and the second, third, and/or other access control device(s). The operation or method may alternatively or additionally include changing the user authentication at a pre-determined frequency of time (e.g., every day, once a week, etc.)

The operation or method may further include automatically initiating, via the mobile device, a user interface when it is determined that the mobile device and the access control device are in proximity to one another. The user interface is configured to request performance of the user authentication. The operation or method may alternatively or additionally include generating, via the mobile device, a code based on the detected movement, and transmitting the code from the mobile device to the access control device. Permitting the short-range communication may thus include permitting the short-range communication when the code substantially matches an authentication code associated with the user authentication.

Figure 5:
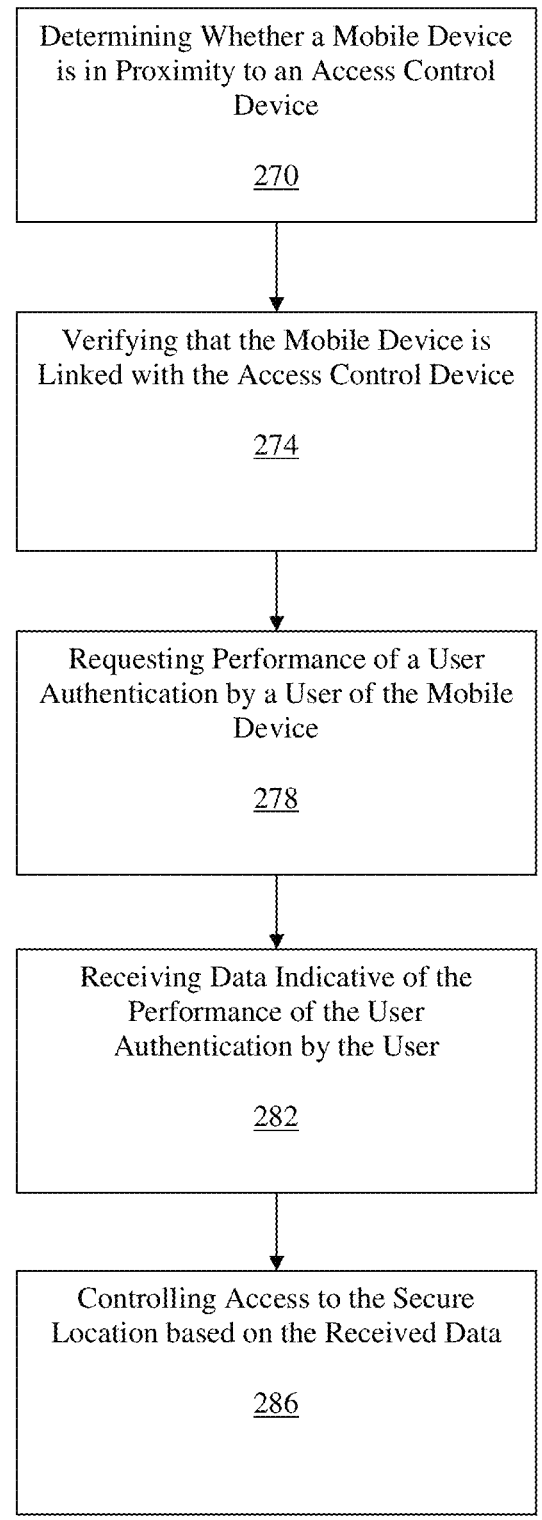
FIG. 5 depicts a flow chart showing another embodiment of a method for enhancing security of short-range communication between a mobile device and an access control device.

FIG. 5 shows a flow chart depicting a method or operation for enhancing the security of short-range communication (e.g., Bluetooth, Bluetooth low energy, near-field communication) between a mobile device (e.g., the mobile device 108) enabled as a first short-range communication device and an access control device (e.g., the access control device 104) enabled as a second short-range communication device. The method or operation may be implemented using the system 100 described above. In other embodiments, a different system may be used. The method is implemented in the order shown, but may be implemented in or according to any number of different orders. Additional, different, or fewer acts may be provided. For example, the determining, verifying, requesting, and receiving acts may be performed any number of times.

The method or operation includes determining, at the access control device, which is configured to control access to a secure location, whether the mobile device is in proximity to the access control device (act 270). The method or operation includes verifying, at the access control device, that the mobile device is linked with the access control device when the mobile device is in proximity to the access control device (act 274). The method or operation includes requesting performance of a user authentication by a user of the mobile device when the mobile device is linked with the access control device (act 278). The user authentication is defined by an end user of the mobile device and is related to a movement of the end user. The requesting may, in some embodiments, include initiating, via the mobile device, a user interface (e.g., the user interface 172) for the performance of the user authentication by the user.

The method or operation includes receiving, at the access control device, data indicative of the performance of the user authentication by the user of the mobile device (act 282). The data is received from the mobile device. The receiving may, in some embodiments, include receiving the data including a code generated by the mobile device based on the performance of the user authentication. The method or operation may thus further include comparing the code with an authentication code associated with the user authentication.

The method or operation further includes controlling, at the access control device, access to the secure location based on the received data (act 286). The controlling may, in some embodiments, include permitting access to the secure location when the code received from the mobile device substantially matches the authentication code. To the contrary, the controlling may include preventing access to the secure location when the code received from the mobile device does not substantially match the authentication code.

Figure 6:
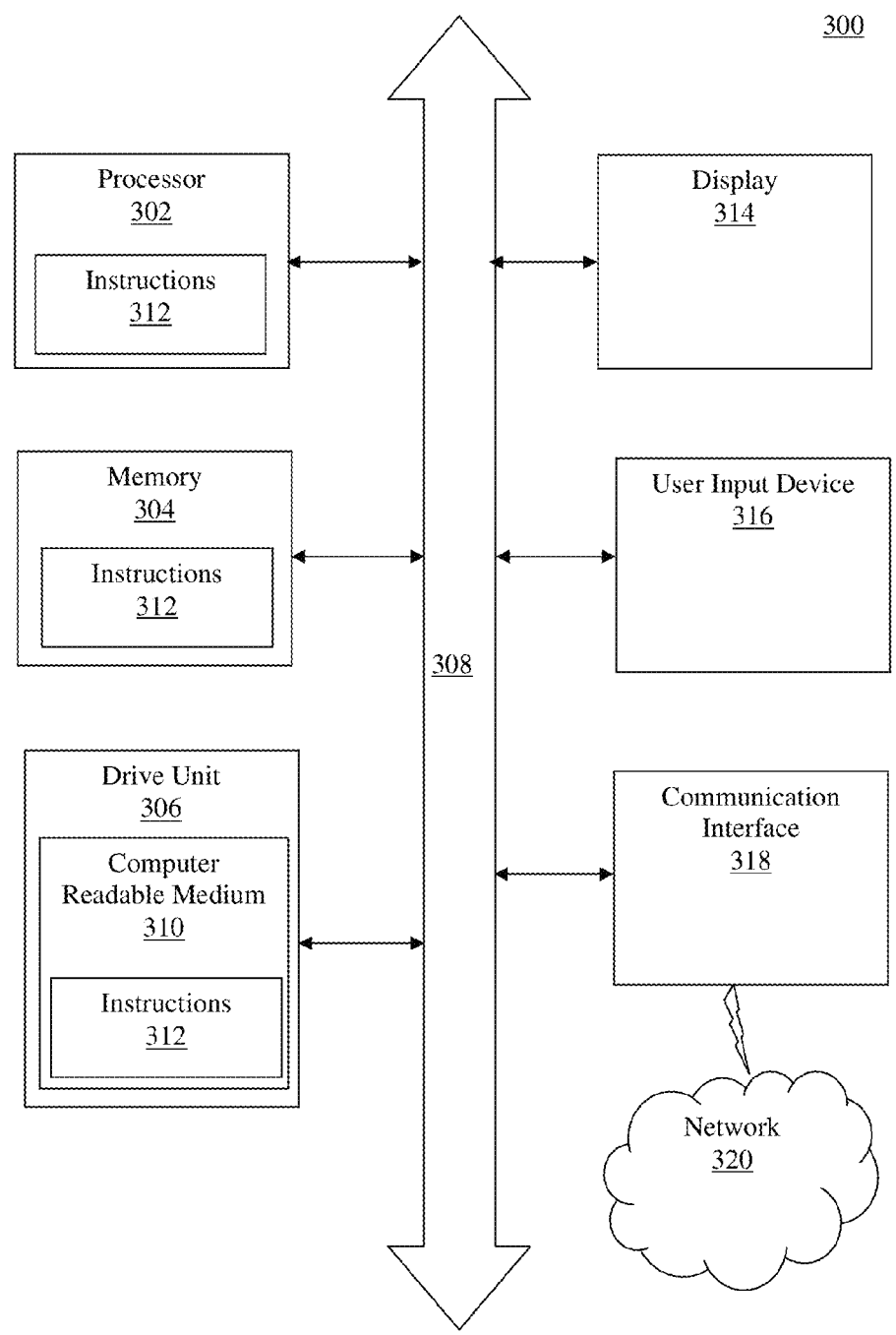
FIG. 6 depicts an exemplary computer system for use with the system of FIG. 1.

As noted above, the access control device 104, application 170, any other device, system, or application or module, or individual components of any application, device, or system, may be implemented as computer program logic or computer readable program code stored in the memory and/or storage of a computer, such as the computer 300. FIG. 6 illustrates an embodiment of the computer system 300. The computer system 300 can include a set of instructions that can be executed to cause the computer system 300 to perform any one or more of the methods or computer based functions disclosed herein. The computer system 300 may operate as a standalone device or may be connected, e.g., using a network, to other computer systems or peripheral devices. Any of the components discussed above may be a computer system 300 or a component in the computer system 300.

In a networked deployment, the computer system 300 may operate in the capacity of a server or as a client user computer in a client-server user network environment, or as a peer computer system in a peer-to-peer (or distributed) network environment. The computer system 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 300 can be implemented using electronic devices that provide voice, video or data communication. Further, while a single computer system 300 is illustrated, the term "system" shall also be taken to include any collection of systems or sub-systems that individually or jointly execute a set, or multiple sets, of instructions to perform one or more computer functions.

As illustrated in FIG. 6, the computer system 300 may include a processor 302, e.g., a central processing unit (CPU), a graphics processing unit (GPU), or both. The processor 302 may be a component in a variety of systems. For example, the processor 302 may be part of a standard personal computer or a workstation. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The computer system 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 304 includes a cache or random access memory for the processor 302. In alternative embodiments, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the programmed processor 302 executing the instructions stored in the memory 304. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As shown, the computer system 300 may further include a display unit 314, such as a liquid crystal display (LCD), an organic light emitting diode (OLED), a flat panel display, a solid state display, a cathode ray tube (CRT), a projector, a printer or other now known or later developed display device for outputting determined information. The display 314 may act as an interface for the user to see the functioning of the processor 302, or specifically as an interface with the software stored in the memory 304 or in the drive unit 306.

Additionally, the computer system 300 may include an input device 316 configured to allow a user to interact with any of the components of system 300. The input device 316 may be a number pad, a keyboard, or a cursor control device, such as a mouse, or a joystick, touch screen display, remote control or any other device operative to interact with the system 300.

In a particular embodiment, as depicted in FIG. 6, the computer system 300 may also include a disk or optical drive unit 306. The disk drive unit 306 may include a computer-readable medium 310 in which one or more sets of instructions 312, e.g. software, can be embedded. Further, the instructions 312 may embody one or more of the methods or logic as described herein. In a particular embodiment, the instructions 312 may reside completely, or at least partially, within the memory 304 and/or within the processor 302 during execution by the computer system 300. The memory 304 and the processor 302 also may include computer-readable media as discussed above.

The present disclosure contemplates a computer-readable medium that includes instructions 312 or receives and executes instructions 312 responsive to a propagated signal, so that a device connected to a network 320 can communicate voice, video, audio, images or any other data over the network 320. Further, the instructions 312 may be transmitted or received over the network 320 via a communication port 318. The communication port 318 may be a part of the processor 302 or may be a separate component. The communication port 318 may be created in software or may be a physical connection in hardware. The communication port 318 is configured to connect with a network 320, external media, the display 314, or any other components in system 300, or combinations thereof. The connection with the network 320 may be a physical connection, such as a wired Ethernet connection or may be established wirelessly as discussed below. Likewise, the additional connections with other components of the system 300 may be physical connections or may be established wirelessly.

The network 320 may include wired networks, wireless networks, or combinations thereof. The wireless network may be a cellular telephone network, an 802.11, 802.16, 802.20, or WiMax network. Further, the network 320 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
    associating a mobile device enabled as a first short-range communication device with an access control device enabled as a second short-range communication device, the access control device configured to control access to a secure location
    storing registration data for the mobile device at the access control device;
    receiving, via the mobile device, a user authentication for permitting short-range communication with the access control device, the user authentication related to a movement of an end user of the mobile device;
    determining whether the mobile device and the access control device are in proximity to one another;
    permitting a first short-range communication session between the mobile device and the access control device;
    confirming an association between the mobile device and the access control device using the registration data;
    preventing further short-range communication between the mobile device and the access control device when no association exists;
    permitting a second short-range communication session between the mobile device and the access control device when the association exists, when the access control device and the associated mobile device are in proximity to one another, and when a detected movement of a user of the mobile device is substantially similar to the user authentication, the second short-range communication session related to access information for permitting the user to access the secure location based on access criteria for the secure location; and
    changing the user authentication at a pre-determined frequency of time.

2. The method of claim 1, wherein receiving the user authentication comprises providing the user authentication, the user authentication comprising a gesture of the end user of the mobile device.

3. The method of claim 1, wherein receiving the user authentication comprises providing the user authentication, the user authentication comprising a movement, relative to the mobile device, of a body part of the end user of the mobile device.

4. The method of claim 1, wherein providing the user authentication comprises providing the user authentication comprising a plurality of movements performed by the end user of the mobile device on a display of the mobile device.

5. The method of claim 1, further comprising automatically initiating, via the mobile device, a user interface configured to request performance of the user authentication when it is determined that the mobile device and the access control device are in proximity to one another.

6. The method of claim 1, further comprising providing, via the mobile device, a second user authentication, different from the user authentication, for permitting short-range communication with a second access control device, the second access control device associated with a second secure location different from the secure location.

7. The method of claim 1, further comprising:
maintaining access to the secure location for a pre-determined amount of time which varies based on the end user, based on the secure location, based on whether other users are at the secure location, or some combination thereof.

8. The method of claim 1, wherein controlling further comprises maintaining access to the secure location for a pre-determined amount of time which varies based on the user of the mobile device, based on the secure location, based on whether other users are at the secure location, or some combination thereof.

9. An apparatus comprising:
a mobile device operable as a first short-range communication device; and
a mobile application executing on the mobile device and configured to store a user defined authentication for permitting short-range communication with an associated access control device operable as a second short-range communication device and configured to control access to a secure location, the user defined authentication related to an action of an end user of the mobile device,
wherein the mobile application is configured to permit a first short-range communication between the mobile device and the access control device, confirm an association between the mobile device and access control device, prevent further short-range communication when no association exists, determine when the mobile device and the access control device are in proximity to one another, detect an action of a user of the mobile device, and permit a second short-range communication between the mobile device and the access control device based on access criteria, and when the mobile device and the access control device are in proximity to one another and the detected action is substantially similar to the defined user authentication, the second short-range communication related to access information for permitting the user to access the secure location based on access criteria for the secure location,
wherein the user authentication changes at a pre-determined frequency.

10. The apparatus of claim 9, wherein the access control device is configured to control access to a location or a vehicle.

11. The apparatus of claim 9, wherein the user defined authentication comprises a movement of the end user performed on the mobile device.

12. The apparatus of claim 9, wherein the user defined authentication comprises a movement, relative to the mobile device, of a head, arm, or finger of the end user of the mobile device.

13. The apparatus of claim 9, wherein the mobile application is configured to automatically provide a user interface on a display of the mobile device when the mobile device and the access control device are in proximity to one another, the user interface being configured to request performance of the user defined authentication.

14. The apparatus of claim 9, wherein the mobile device is registered with the access control device.

15. A method comprising:
determining, at an access control device enabled as a first short-range communication device and configured to control access to a secure location, whether a mobile device enabled as a second short-range communication device is in proximity to the access control device;
storing, at the access control device, registration data for the mobile device linking the access control device and mobile device;
permitting, at the access control device, a first communication session between the access control device and mobile device;
verifying, at the access control device, when the mobile device is in proximity to the access control device, that the mobile device is linked with the access control device;
preventing further communication when the mobile device is not linked with the access control device;
permitting, at the access control device, a second communication session between the access control device and mobile device based on access criteria, and when the mobile device is in proximity to the access control device and the mobile device and access control device are linked;
requesting, when the mobile device is linked with the access control device, performance of a user authentication by a user of the mobile device, the user authentication defined by an end user of the mobile device and related to a movement of the end user of the mobile device;
receiving, at the access control device, data indicative of the performance of the user authentication by the user of the mobile device, the data received from the mobile device;
controlling, at the access control device, access to the secure location based on the received data and access criteria for the secure location; and
providing, via the mobile device, a second user authentication, different from the user authentication, for permitting short-range communication with a second access control device, the second access control device associated with a second secure location different from the secure location.

16. The method of claim 15, wherein requesting comprises initiating, via the mobile device, a user interface for the performance of the user authentication by the user.

17. The method of claim 15, wherein receiving comprises receiving data comprising a code generated by the mobile device based on the performance of the user authentication.

18. The method of claim 17, further comprising comparing the code with an authentication code associated with the user authentication.

19. The method of claim 18, wherein controlling comprises permitting access to the secure location when the code received from the mobile device substantially matches the authentication code.

20. The method of claim 15, further comprising automatically requesting, when it is determined that the mobile device is in proximity to the access control device, the provisioning of the user authentication via a user interface of the mobile device.

* * * * *